Oct. 9, 1934.   H. B. BABSON   1,976,536
COW STANCHION (ADJUSTABLE)
Filed Aug. 1, 1930   2 Sheets-Sheet 1

Inventor:
Henry B. Babson
By Cheever, Cox + Moore attys.

Oct. 9, 1934.  H. B. BABSON  1,976,536
COW STANCHION (ADJUSTABLE)
Filed Aug. 1, 1930  2 Sheets-Sheet 2
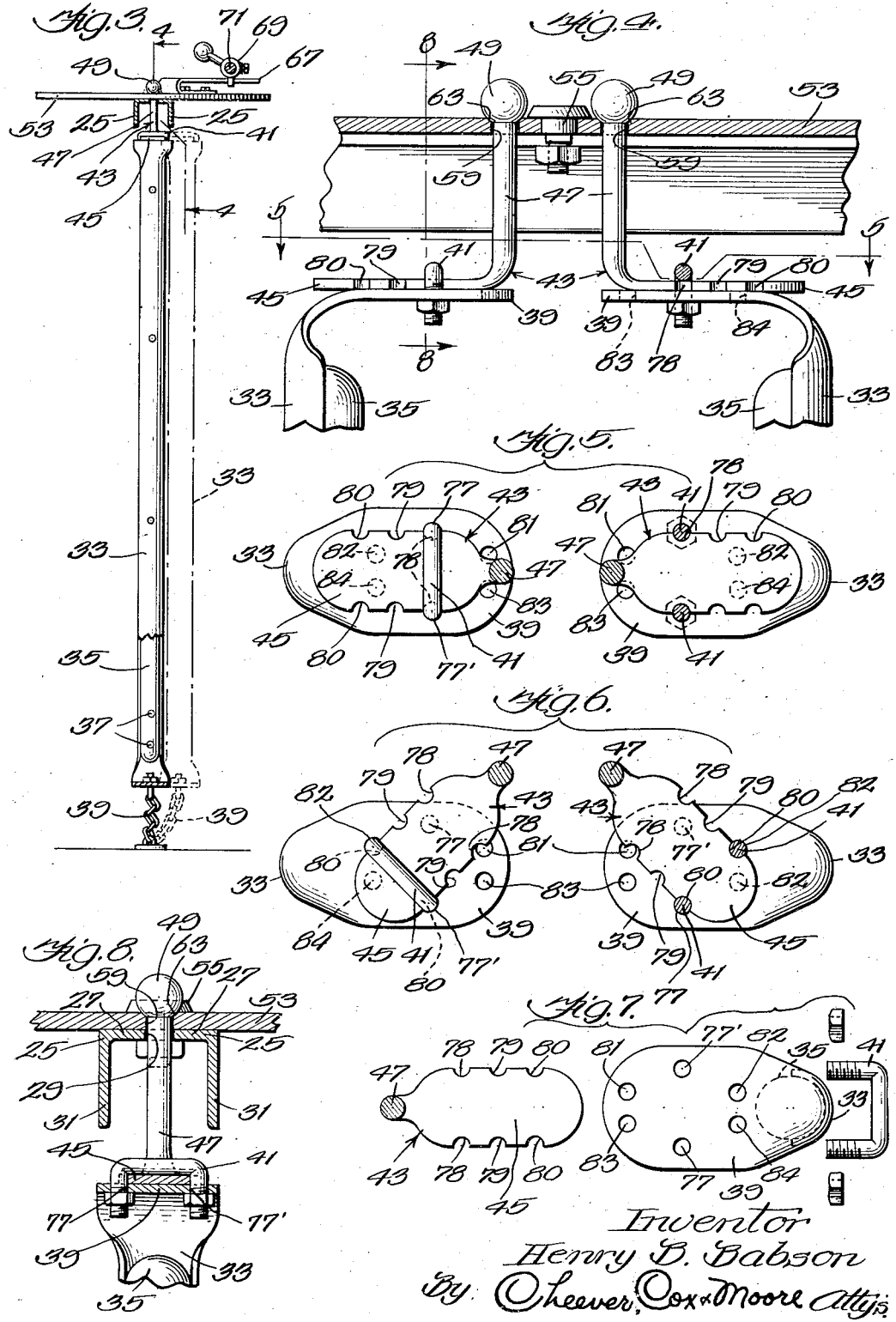
Inventor
Henry B. Babson
By Cheever, Cox & Moore Attys.

Patented Oct. 9, 1934

1,976,536

UNITED STATES PATENT OFFICE 1,976,536

COW STANCHION (ADJUSTABLE)

Henry B. Babson, Chicago, Ill., assignor to Babson Manufacturing Corporation, Chicago, Ill., a corporation of Illinois Application August 1, 1930, Serial No. 472,372

8 Claims. (Cl. 119—148)

My present invention relates in general to cow stanchions and has more particular reference to an adjustable cow stanchion, whereby the yoke of the stanchion may be adjusted to fit the neck and to some extent the length of the animal occupying the stanchion.

An important object of my present invention also resides in the provision of a cheap, novel and rugged stanchion construction, which may be quickly and easily assembled.

Another important object is the provision of simple and inexpensive guide means for the relatively shiftable arms of a stanchion yoke.

Another important object is to provide a stanchion in which the yoke may be quickly and easily shifted with respect to its supports in a direction to adjust the stanchion in the stall to take care of the various lengths of animals using the stall.

Another object of the invention is to provide a hanger for the yoke of a cow stanchion which may be attached to the arms of a yoke in any one of a plurality of relatively shifted positions so that the position of the arms of the yoke may be adjusted with respect to the stanchion supports to thus conform the arms to the size and shape of an animal to be stanchioned.

Numerous other objects and advantages of the invention may be more fully understood from the following description which taken in connection with the accompanying drawings discloses a preferred embodiment of my invention.

Referring to the drawings:

Figure 3 is a vertical section taken substantially along the lines 3—3 in Figure 1;

Figure 4 is a vertical section taken substantially along the line 4—4 in Figure 3;

Figure 5 is a horizontal section taken substantially along the line 5—5 in Figure 4;

Figure 6 is similar to Figure 5 showing certain of the parts of the apparatus in a relatively shifted position;

Figure 7 is a disassembled view of the parts of the apparatus shown in Figures 5 and 6; and Figure 8 is a vertical section taken substantially along the line 8—8 in Figure 4.

Figure 1:
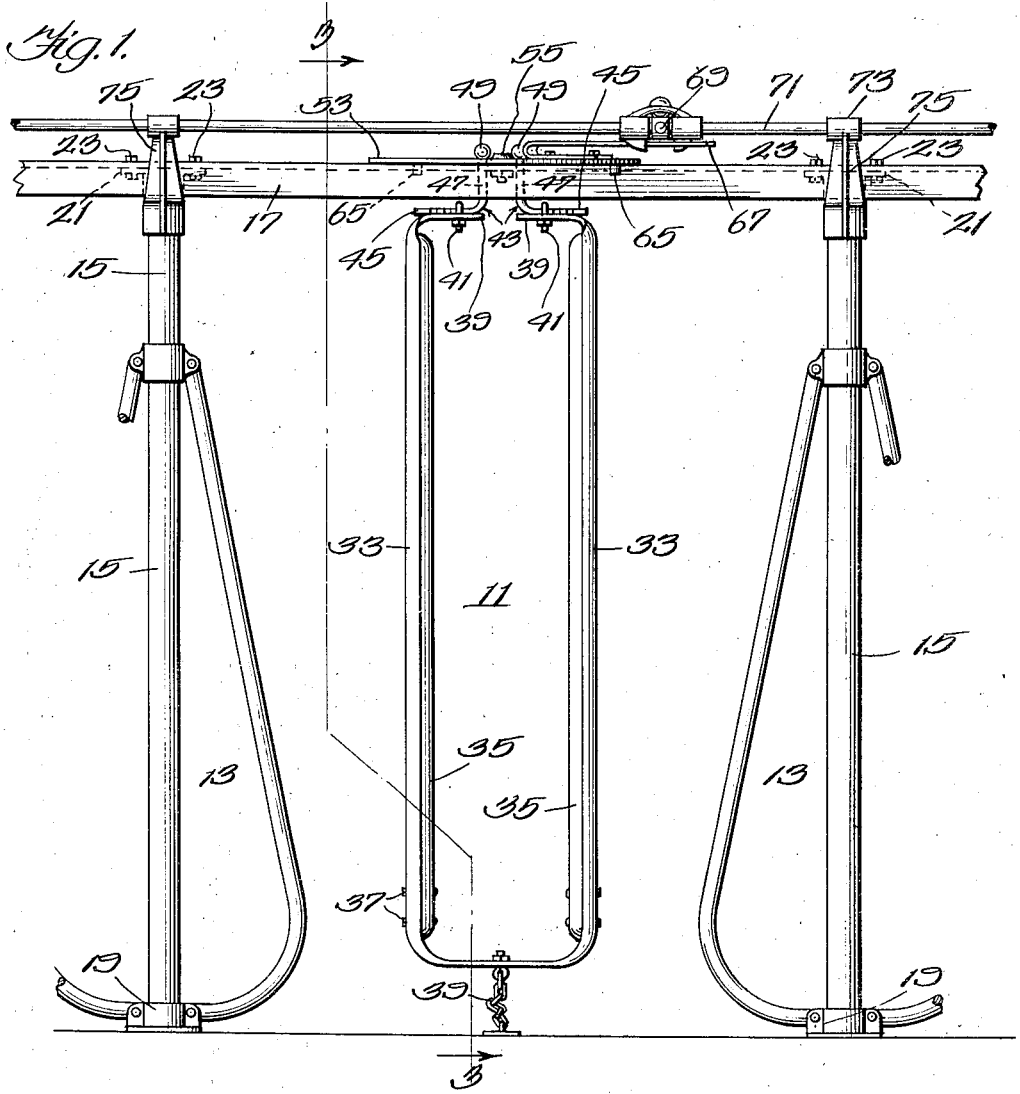
Figure 1 is a perspective view of a part of a row of stanchions embodying my present invention.

To illustrate my invention I have shown on the drawings a portion or section of a row of cow stanchions 11. It will be understood that a series of cow stanchions similar to the one illustrated may be arranged in spaced relationship along the side of a barn or other structure used to house the animals to be stanchioned, each stanchion being separated from the adjacent stanchions by partitions 13, which are or may be built into the stanchion support structure.

This construction is preferably formed as shown in the drawings of vertical spaced uprights 15, which carry at their upper ends an elongated support member 17, which may extend the entire length of the set or series of stanchions to form a support from which the stanchions 11 are suspended. The frame may of course be formed of any suitable structure or material, but I prefer to form the upright members 15 of tubular members which are or may be secured to the floor in any suitable manner, such as by the pipe flanges 19. The uprights 15 are also or may be provided at their upper ends with brackets 21 to which the elongated support member 17 is or may be secured as by the fastening members 23. I prefer also to form the support member 17 of co-operating spaced apart angle irons 25, the horizontal flanges 27 of which are secured to the brackets 21 with their edges spaced apart sufficiently to form an opening or slot 29 therebetween, while the lateral or vertical flanges 31 of the angle irons 25 overhang the opposed edges of the support bracket 21.

The stanchions 11 comprise yokes which are hung from the support member 17. These yokes each comprise a pair of arms 33 preferably formed of spring steel and having intermediate portions curved to form inwardly facing channels adapted to receive circular rods 35 of wood or other suitable material capable of providing a comfortable wearing surface for engaging the neck of the animals. The wooden rods 35 are or may be secured to the arms 33 in any suitable manner as by means of the rivets 37. The lower ends of the arms 33 are or may be connected together in spaced relationship by any suitable means and are or may be loosely connected to the floor as by the chain 39. The upper end of each arm 33 is curved inwardly to provide a flattened flange portion 39, which is provided with a plurality of perforations capable of receiving a connector 41, whereby to detachably fasten the flange to a fitting 43 having a relatively flat portion 45, adapted to engage and be clamped against the flanged portion 39 of the arms, and an upstanding finger-like portion 47.

These fingers extend upwardly of the yoke and through the slot 29 of the support member, being provided at their upper ends with spherical or enlarged globular ends 49, which said ends are larger in diameter than the width of the slot 29. In order to permit these enlarged ends of the fingers 47 to be passed into and upwardly through the slot 29, the horizontal flanges 27 of the angle irons 25 are relieved at registering points 51 in their edges to form an enlargement of the slot 29 through which said enlargement the enlarged ends 49 of the fingers 47 may be passed. The fingers 47 are sufficiently small in diameter to be slidable in the slot 29.

The yoke can of course be suspended directly from the support member 17 by the engagement of the enlarged portions 49 with the upper edge of the slots 29. However, I prefer to utilize an intermediate plate 53, which is pivoted on a pin 55 carried by the support member 17, the said pin 55 being bolted in the slot 29 in the central axis of the yoke 11 intermediate the support fingers 47. The plate 53 is thus rotatable on the pin 55 and is provided with a pair of cam slots 57, which like the slot 29 have sufficient width to receive the fingers 47, but are narrower than the enlarged ends 49 thereof. The slots 57 extend in the disc 53 from points 59 closely spaced on either side of the pivot pin 55, thence along curved paths to points 61 adjacent the circumference of the disc 53. The outer ends 61 of the slots 57 are preferably enlarged sufficiently to permit the ends 49 of the fingers 47 to pass upwardly therethrough in order that the fingers 47 may enter the curved slots 57.

Figure 2:
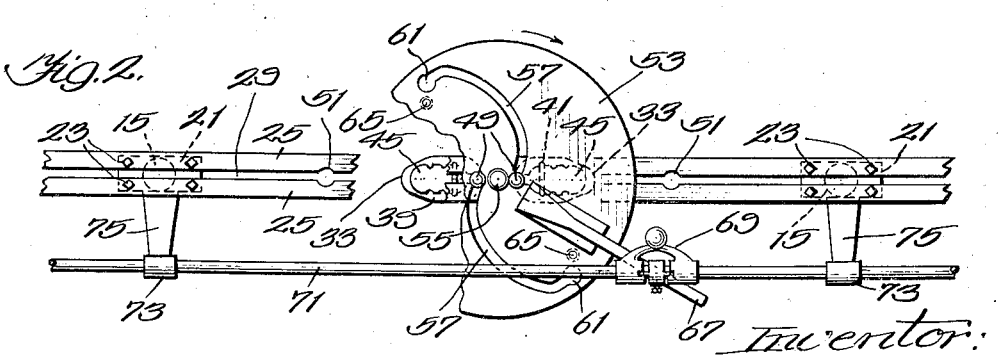
Figure 2 is a top plan view of the apparatus illustrated in Figure 1.

This plate of course supports the yoke 11, the enlarged portions 49 engaging the upper edges of the slots 57, which preferably are beveled as at 63 to reduce abrasion on the knobs 49 as the same travel along the slots 57. But an equally important function of the plate 53 is to provide means for shifting the arms 33 of the yoke, in order to open and close same. This is accomplished by rotating the disc 53. If the disc is rotated to the position illustrated in the drawings, the fingers 47 will become arranged in the closely spaced portions of the slot 57 and will thus be drawn together so that the yoke assumes closed position. If from this position the disc is rotated in the direction indicated by the arrow in Figure 2 of the drawings, the fingers 47 will be separated by the cam action of the diverging slots 57 and will be forced outwardly along the guide slot 29 until the fingers 47 reach a position near the circumference of the disc 53. At this point the yoke will be in open position. Detachable stops 65 are provided to prevent the disc 53 from rotating sufficiently to permit the bulbs 49 to enter the enlarged portions 61 except when it is desired to remove the yoke from its support, which may be accomplished by removing the stops 65 and rotating the disc until the bulbs can be drawn through the enlarged portions 61 of the slots 57.

I provide means including a handle 67 extending outwardly of the disc 53 for the purpose of rotating same. This rotation may be accomplished manually where the handles 67 of any or all of the stanchions of a set may be connected at will, as by the locking mechanism indicated at 69 to a longitudinally slidable shaft 71, which parallels the row of stanchions. The shaft 71 is or may be supported in bearings 73 carried in suitable brackets 75, which in turn are mounted to the upper ends of the spaced uprights 15. By means of this mechanism all of the stanchions of a set may be simultaneously opened or closed and any individual stanchion may be disconnected from the operating shaft for individual manual operation.

In order to provide for the adjustment of the stanchion yoke to the individual characteristics of the animal occupying the stall, I provide means for fastening the fitting 43 to the flange 39 in any one of a number of shifted positions. For this purpose the flange 39 is provided with a pair of spaced perforations 77 and 77' arranged on a line normal to the longitudinal axis of the flange. The perforations are spaced sufficiently to receive the ends of the U-bolt 41. The opposite edges of the flat portion 45 of the fitting 43 also are provided with registering pairs of notches 78, 79 and 80. These notches are spaced also to engage the arms of the U-bolt and it will be obvious that the part 43 may be clamped to the flange 39 as illustrated in Figure 5 of the drawings by passing the U-bolt over the back of the plate 45 and through the notches 78, 79 or 80, and through the perforations 77 and 77' of the flange 39 of the yoke arms.

If the arms are to close tightly to retain the thin neck of a small animal, the part 43 will be arranged with the U-bolt passing through the notches 78, which are closet to the fingers 47, while if the neck of a larger animal is to be accommodated, either of the other pair of notches 79 or 80 may be utilized to obtain a wide spacing of the yoke arms. The flange 39 is also provided with additional perforations 81, 82, 83 and 84 and by arranging the arms of the U-bolt in any of the combinations 77—81, 77—82, 77'—83, 77'—84, the fitting 43 may be arranged at an angle to the flange 39, as shown in Figure 6 of the drawings with the fingers 47 shifted out of the plane of the yoke arms 33. As the yoke is suspended by the bulbs 49 at the top of the arms 47, it will be apparent that, by so shifting the support fingers 47 out of the plane of the yoke arms, the position of the yoke itself may be shifted forwardly or rearwardly in the stall. Even when the fitting 43 is clamped in angular position upon the flange 39, the spacing of the arms 33 can be varied as described above by engaging the proper pair of notches 78, 79 or 80 with the arms of the clamping U-bolt.

It is thought that the invention and numerous of its attendant advantages will be more fully understood from the foregoing description and it is obvious that numerous changes may be made in the form, construction and arrangement of the several parts without departing from the spirit and scope of my invention or sacrificing any of its attendant advantages, the form hereinbefore described being a preferred embodiment for the purpose of illustrating my invention.

Having thus described my invention what I claim as new and desire to secure by Letters Patent is:

1. A cow stanchion comprising a horizontal support member, a yoke having relatively shiftable spaced arms, means to suspend said yoke from said support member, said means comprising a pair of fingers detachably connected to the upper ends of the spaced arms forming the yoke and means to connect said fingers for sliding movement with respect to the support member, said fingers being connected to their corresponding yoke arms in any one of a number of relatively angular shifted positions, whereby to adjust the yoke for the accommodation of various sizes of animals.

2. In a stanchion, a yoke comprising a pair of spaced apart arms, means, comprising fingers on the arms, for supporting the yoke in animal receiving position, means for adjusting the yoke to accommodate various sizes of animals to be stanchioned comprising means providing for the connection of said fingers to the yoke in any one of a number of relatively rotated positions whereby to adjust the spacing of the arms of the yoke when in closed animal retaining position.

3. In a stanchion, a supporting structure, a yoke comprising a pair of spaced arms adapted to open to receive the neck of an animal to be stanchioned and to close upon the neck to thus retain the animal in the stall, said arms being provided with flanges at their upper ends and upstanding fingers detachably connected to said flanges, each finger having an upstanding portion, means to connect the upstanding portion with the stanchion supporting structure and each finger having a plate-like portion adapted to engage the arm flange of the yoke and means for detachably connecting the plates and flanges together in a number of relative angular or rotated relationships.

4. In a stanchion, a supporting structure, a yoke comprising a pair of spaced arms adapted to open to receive the neck of an animal to be stanchioned and to close upon the neck to thus retain the animal in the stall, said arms being provided with flanges at their upper ends and upstanding fingers detachably connected to said flanges, each finger having an upstanding portion, means to connect the upstanding portion with the stanchion supporting structure, said fingers having each a plate-like portion adapted to engage the arm flange of the yoke and U-bolts for detachably connecting the plates and flanges together in a plurality of relatively shifted positions, the plate-like portion of each finger member being formed with notches at its opposed edges, and the arm flanges of the yoke being formed with perforations, and said U-bolts adapted to engage said notches and perforations.

5. In a stanchion, a frame providing an elongated slot, a yoke supporting means comprising a plate having a slotted portion carried in said frame above the elongated slot, a yoke having a portion extending through said elongated slot and through the slotted portion of the support means, said yoke portion having an enlargement above the slotted portion whereby the yoke is suspended therefrom, the slotted portion of the support means being relieved at a point in the length thereof to permit said enlargement to be passed therethrough in assembling the yoke portion in the slotted portion of the support means and means to prevent said enlargement from assuming a position permitting withdrawal thereof through said relieved portion.

6. A stanchion having a horizontal support member comprising spaced bars assembled in parallel relationship to define an elongated opening therebetween, a yoke including arms and fingers connected to the upper end of the arms, and yoke-operating means carried on the frame and operatively engaging the fingers, said fingers being slidable with respect to the horizontal support member and being guided thereby during their sliding movement, said arms and fingers being formed with cooperating portions whereby the fingers may be mounted in any one of various relative angular positions with respect to the arms in order to accomodate the yoke to various animal sizes.

7. In a stanchion, a yoke having a shiftable arm forming a yoke member, said arm having a terminal flange provided with a plurality of perforations, a U-bolt having arms adapted to be received in various pairs of said perforations whereby the U-bolt may be mounted on the flange in any one of a plurality of relatively oriented positions, a finger member having a plate-like portion adapted to be received between the flange and the U-bolt when in position thereon, said plate-like portion having registering notches formed in its opposite edges, means to fasten the U-bolt to the flange in any one of the relatively oriented positions, and means cooperatively associated with the finger member for supporting the yoke member in the stanchion.

8. In a stanchion, a frame having a yoke guide, yoke-operating means shiftable on the frame having a portion formed with an elongated slot, and a yoke having arms, at least one of which is supported from said frame and another of which has a narrow portion extending in said guide and in said slot and formed above the narrow portion with an enlarged portion whereby the yoke is suspended in the slot, said slot being enlarged at one point to permit the enlarged portion of the yoke arm to be passed therethrough in assembling the narrow portion in the slot, the slotted portion of said operating means being shiftable on the frame in a direction intersecting the path of movement of the yoke arm in said guide whereby to exert a camming action upon the yoke arm to move the same in said guide.

HENRY B. BABSON.